United States Patent [19]

Soendergaard

[11] Patent Number: 4,563,941
[45] Date of Patent: Jan. 14, 1986

[54] HYDRAULIC ACTUATOR FOR CONTROL OF VALVES

[75] Inventor: Joergen Soendergaard, Naestved, Denmark

[73] Assignee: Danfoss A/S, Nordborg, Denmark

[21] Appl. No.: 649,693

[22] Filed: Sep. 12, 1984

[30] Foreign Application Priority Data

Sep. 16, 1983 [DK] Denmark .................................. 4224

[51] Int. Cl.[4] .................................................. F01B 7/00
[52] U.S. Cl. .......................................... 92/134; 92/31; 92/152
[58] Field of Search ............................. 92/134, 31, 152

[56] References Cited

U.S. PATENT DOCUMENTS

| | | | |
|---|---|---|---|
| 3,509,795 | 5/1970 | Woodward | 92/134 |
| 3,925,985 | 12/1975 | Peterson | 92/134 |
| 3,977,305 | 8/1976 | Sondergaad | 92/31 |
| 4,103,591 | 8/1978 | Reiersdal | 92/134 |
| 4,226,167 | 10/1980 | Lew | 92/134 |

Primary Examiner—Paul E. Maslousky
Attorney, Agent, or Firm—Wayne B. Easton

[57] ABSTRACT

The invention relates to a hydraulic actuator for the control of valves such as the kind found in ships. The actuator has a piston which is actuated in a valve opening direction with a hydraulic pressure medium and may be actuated in the return direction by a gas-compression type spring. Certain emergency situations require an immediate closing of a valve or group of valves controlled by the piston acting through a spindle. Emergency closing apparatus includes an abutment on the piston which forms an annular chamber when the piston abuts the end wall of the piston cylinder. The housing has an emergency passage means in fluid communication with the annular chamber when the piston abuts the end wall to effect an emergency moving of the piston in a valve closing direction when a pressure medium is admitted into the emergency passage.

1 Claim, 1 Drawing Figure

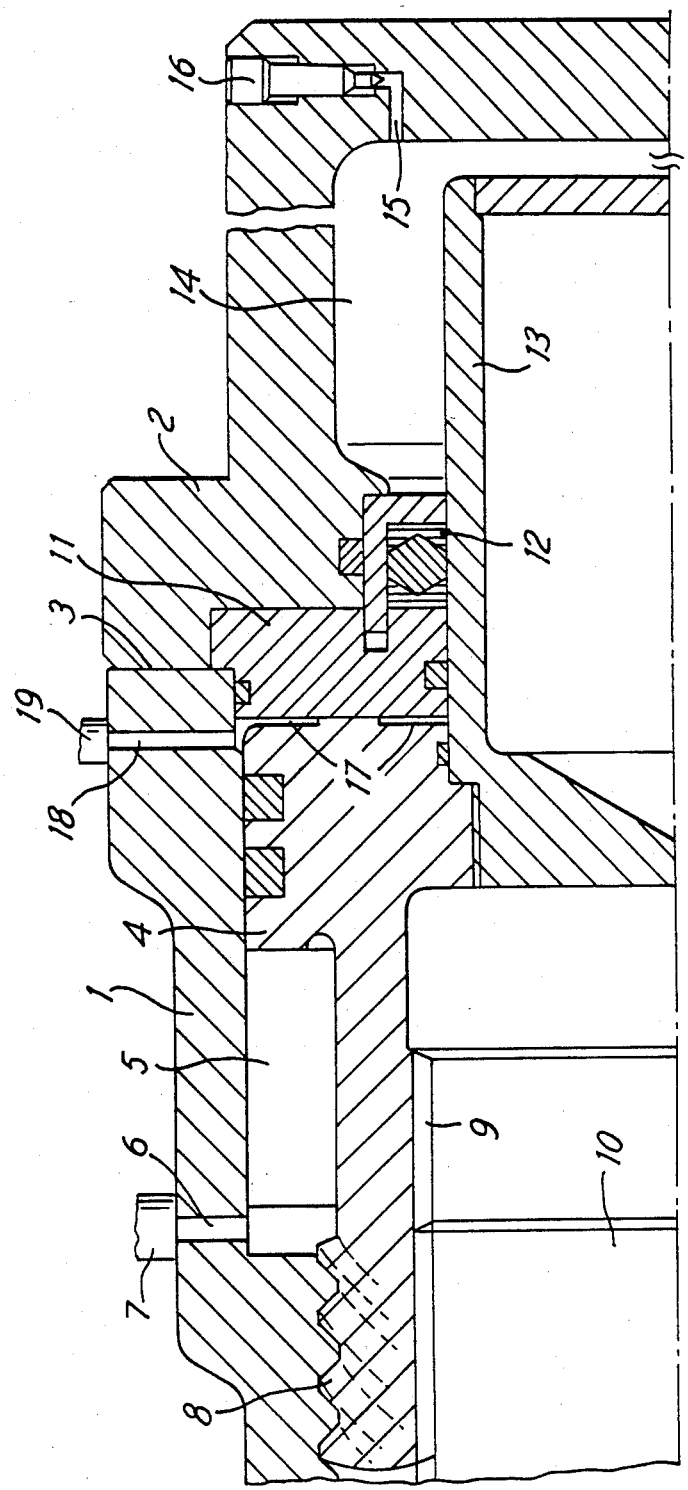

HYDRAULIC ACTUATOR FOR CONTROL OF VALVES

The invention relates to a hydraulic actuator for control of valves, e.g. in ships, and with a housing containing a sliding piston which is driving-connected with an actuator spindle and is, through a hydraulic pressure medium applied to one of the sides of the piston, movable against the effect of a return spring, preferably a gas-compression spring.

The said driving connection may be of such a kind that the actuator spindle is actuated concurrently with the motion of the piston, or the latter motion may—in the generally known way—be converted into an angular motion of the actuator spindle, e.g. when the spindle is connected with a swivel damper.

The generally used valve actuators of the said kind normally work on the principle that the motion of the piston effected by the pressure medium causes the valve to open, and the closing of the valve is effected by the return spring when the piston is relieved of the pressure of the medium. So, the same hydraulic tube is used for both inlet and outlet which permits a certain simplification compared with double-action actuators with a pressure- or actuating chamber on both sides of the piston.

Certain situations may require practically immediate closing of a valve or, maybe, of a considerable number of valves linked in a group and with one actuator each. So long as the actuators and their control apparatus are intact, such a closing can be effected in the normal way, but in case of functional failure, e.g. because of blocking of the hydraulic conduits or insufficient gas-spring compression, closing of the valves may prove impossible.

Because of this problem, some of the ship classification societies have prescribed that the actuators must enable closing of the valves in an emergency, e.g. imminent danger, and the present invention relates to an actuator which fulfils this requirement in a simple and adequate way, namely by a piston having, on its other side, i.e. the side opposite the pressure-loaded one, an abutment with a smaller diameter than the main piston and extending through a transverse wall in the housing, and the latter having a port, from the outside leading to the annular chamber surrounding the abutment and situated between the transverse wall and the main piston.

When the return spring is a gas-compression spring the pressure of which is transmitted to the main piston via the abutment, the latter should pass tightly through the transverse wall to prevent leakage of gas there, but—especially in small actuators—a mechanical spring may be used. If so, this passing point does not have to be tight. In both cases, the abutment and the main piston may be made in one piece or may be permanently assembled, but the abutment may also be separate from the piston because its only function is to transmit pressure to the piston.

When emergency closing of the valve controlled by an actuator is required, pressure medium can be conducted via the said port into the said annular chamber. This pressure medium can alone or together with the return spring—if the latter is still operative—force the piston to move to the position corresponding to a closed valve, possibly by counteracting a pressure on the piston from the opening direction, so that the valve can always be closed. The pressure medium can be applied to the annular chamber by connection of a compressed-air bottle or pump with the port, but it may also be applied by permanent connection with a pressure-medium conduit. The latter is preferable when the actuator is submerged.

An embodiment of the actuator is illustrated in the drawing through a half axial cutaway.

The actuator shown has a housing consisting of a cylinder part (1) and an end cap (2). These parts are bolted together at a joint (3) by means of a ring of bolts which are not indicated.

The cylinder part (1) contains a hollow piston (4) which is, on its underside, loaded by a hydraulic medium in a pressure- or actuating chamber (5) which is, through a wall bore (6) with a nipple (7), connected with an inlet and outlet conduit for the pressure medium, not indicated in the drawing. In the drawing the piston is shown in its upper (right) end position. In an ordinary way, through a multiple steep-pitch thread (8) on its outer side, it meshes with the cylinder part of the housing (1) so that the piston is forced to turn through a certain angle when moving between its end positions. Through splines (9) on the inner side of the piston the rotary motion is transmitted to the actuator spindle (10) which is, in a way not indicated here, seated in and extending through the lower (left-hand) end of the cylinder (1) and outside the cylinder connected with the operated rotary valve.

Fixed between the cylinder (1) and the end cap (2) there is a transverse wall (11) against which the piston (4) rests in the end position shown and which, in a tight way—namely by means of a generally known special packing (12)—, surrounds a piston abutment (13) which extends into the chamber (14) in the end cap (2). In this chamber there is a pressure gas which, via the abutment (13) exerts a downward pressure on the piston (4) (i.e. to the left). The pressure gas is pumped into the chamber through a bore (15) with a valve (16).

Between the piston (4) and the transverse wall (11) an annular chamber (17) is left even in the shown end position of the piston, which chamber is, through a port (18) in the cylinder part (1), connected with a nipple (19) to which a conduit can be connected, permanently or as occasion requires, for feeding of a pressure medium into the annular chamber (17) when the valve is to be emergency-closed as explained above.

What we claim is:

1. A hydraulic actuator assembly for controlling a valve, comprising, a housing defining a cylindrical bore forming a piston chamber and an end cap section forming an end chamber, transversely extending wall means having a central opening and being between said piston and end chambers, said housing forming a sleeve portion spaced from said wall means and having a central opening of lesser diameter than said wall means, piston means having a head portion slidably disposed in said piston chamber and a body portion of lesser diameter extending through said sleeve portion central opening, an actuator spindle connected to said piston means body portion, a cylindrically shaped piston extension of smaller diameter than said piston attached to said piston and extending into said end chamber, said piston extension being in sliding and sealing engagement with said wall means central opening, said housing having inlet and outlet passage means for said piston chamber to operate said piston, said housing having inlet air passage means for providing a piston return pressure gas in said end chamber, said piston head having a cylindrically shaped protruding portion which forms annular chamber means in surrounding relation to said piston extension when said protruding portion is in abutting engagement with said wall means, said housing having emergency passage means in fluid communication with said annular chamber when said protruding portion abuts said wall means to effect an emergency moving of said piston in a valve closing direction when a pressure medium is admitted into said emergency passage means.

* * * * *